Dec. 31, 1940.  E. C. MacLEAN  2,227,098
ROTARY FOOD PULVERIZER AND JUICE EXTRACTOR
Filed May 23, 1938  3 Sheets-Sheet 1

INVENTOR
Ernest C. MacLean
BY
Fred E. Matheny
ATTORNEY

Dec. 31, 1940.                E. C. MacLEAN                2,227,098
                ROTARY FOOD PULVERIZER AND JUICE EXTRACTOR
                    Filed May 23, 1938            3 Sheets-Sheet 2
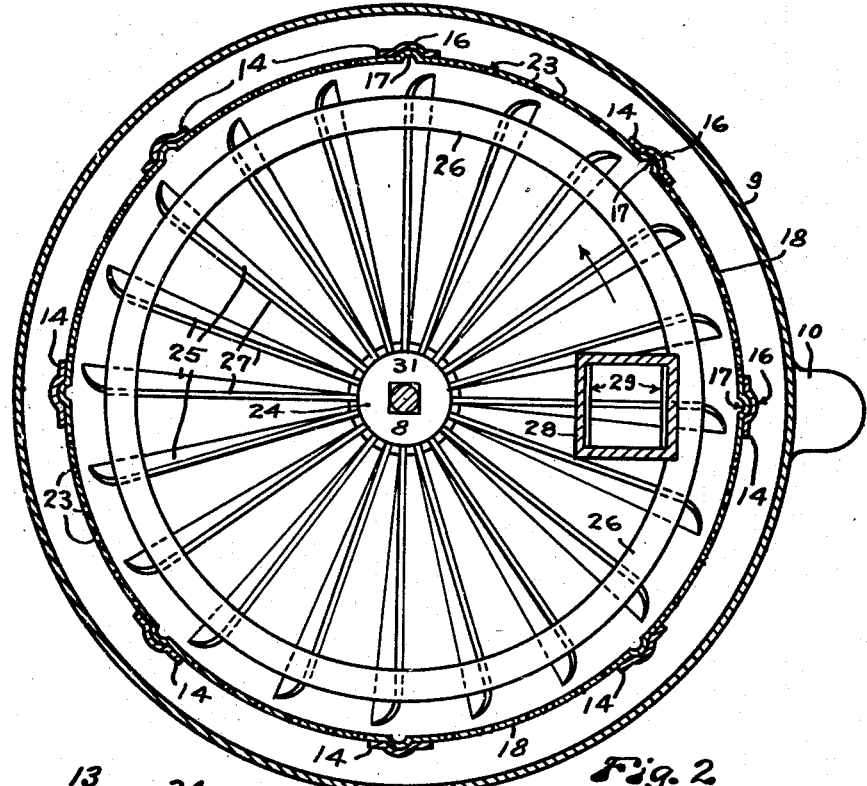
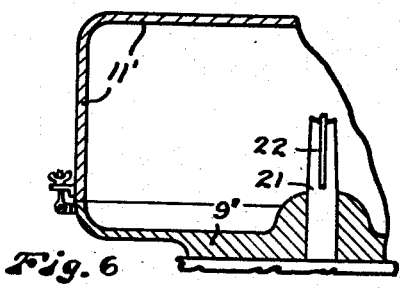
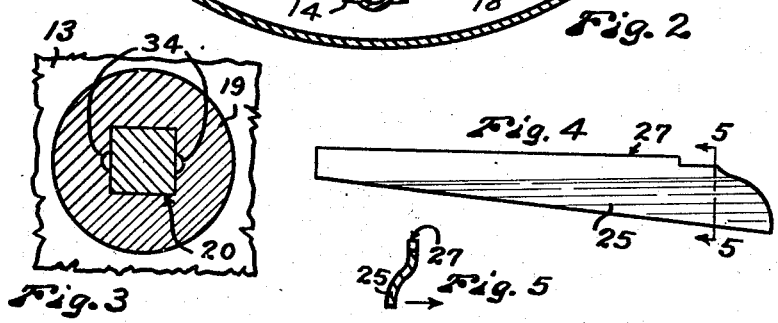
INVENTOR
Ernest C. MacLean
BY
Fred C. Matheusy
ATTORNEY Dec. 31, 1940.  E. C. MacLEAN  2,227,098
ROTARY FOOD PULVERIZER AND JUICE EXTRACTOR
Filed May 23, 1938  3 Sheets-Sheet 3

INVENTOR
Ernest C. Mac Lean
BY
Fred C. Matheny
ATTORNEY

Patented Dec. 31, 1940

2,227,098

UNITED STATES PATENT OFFICE 2,227,098

ROTARY FOOD PULVERIZER AND JUICE EXTRACTOR

Ernest C. MacLean, Seattle, Wash.

Application May 23, 1938, Serial No. 209,413
In Canada May 25, 1937

4 Claims. (Cl. 146—3)

This invention relates to a rotary centrifugal machine for pulverizing liquid bearing food products, or like material containing a high liquid or juice content, and for extracting the liquid or juice content from said pulverized food products or material.

A primary object of this invention is to provide a rotary centrifugal machine which will reduce a juice containing food product to a very finely divided pulp and extract therefrom a very high percentage of the liquid content or juice at a single operation and with a minimum amount of handling of the food thus rendering this machine cheaper to operate and more sanitary and more efficient in operation than are presses of the commonly used type which require the food to first be ground and then placed in the press and subjected to pressure to extract the juice.

Another object of the invention is to provide a high speed rotary type machine which has both a shearing and a beating action on the food thereby pulverizing the food very finely and thoroughly breaking down the cellular structure of the food thus releasing valuable food elements not ordinarily recovered in extracted food juices and further giving a very high yield of juices from the food by making it possible to separate a very large percentage of the juice from the pulp.

Another object is to provide a high speed centrifugal machine of this nature which thoroughly breaks down the cell structure of the food and at the same time aerates the food and the juice by bringing fresh air into intimate contact with the food and the juice during the process of pulverizing the food and separating the juice.

Another object is to provide a high speed rotary machine which may be used for pulverizing food and reducing said food to a very finely divided pulp without extracting the juice therefrom thus processing the food so that it will not require chewing and will be in condition for quick and highly efficient assimilation by the digestive organs of the body.

Another object is to provide a high speed rotary machine which will pulverize and reduce to a very finely divided state the solid or fibrous matter of the food thus rendering said solid or fibrous matter suitable for use as a food after the major portion of the juice has been extracted therefrom said finely divided solid matter being especially well adapted for use as a soup stock for thickening of soups and for like purposes.

Another object of the invention is to provide a high speed rotary juice extractor of this nature which is equipped with means for grinding the inside pulp portion out of citrus fruits without grinding up or pulverizing the peeling thus making it possible to cut the citrus fruit in half, grind out the pulp and extract the juice from the pulp without getting any of the oils and juices of the peeling in the fruit juice.

Other objects of the invention are to provide a high speed rotary pulverizer and juice extractor of strong, simple and efficient construction in which the several parts are readily dis-assembled for the purpose of cleaning, removal or replacement, to provide a machine of this type which is sanitary and easily sterilized and which is made of non corrosive material and to provide a machine of this type which is neat and compact in construction and which is readily made in different sizes as may be required for commercial or domestic use.

Other and more specific objects of the invention will be apparent from the following description taken in connection with the accompanying drawings.

In the drawings

Fig. 2 is a view in cross section substantially on broken line 2—2 of Fig. 1.

Fig. 3 is a fragmentary sectional view on an enlarged scale taken substantially on broken line 3—3 of Fig. 1.

Fig. 4 is a detached elevation of a high speed rotary blade embodied in the invention.

Fig. 5 is a sectional view of said blade substantially on broken line 5—5 of Fig. 4.

Fig. 6 is a fragmentary sectional view illustrating a modified form of the invention.

Like reference numerals designate like parts throughout the several views.

Figure 1:
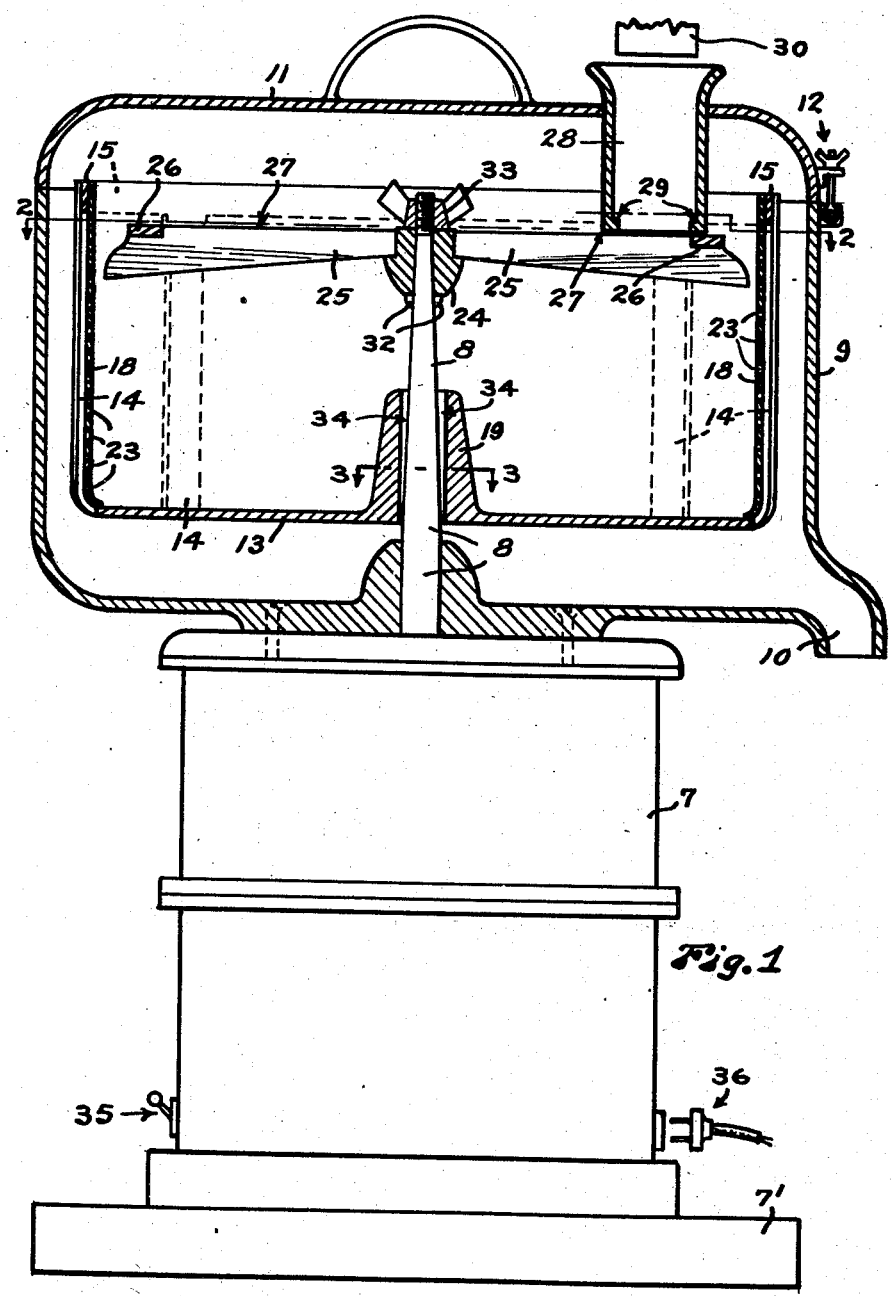
Fig. 1 is a view in vertical section of a centrifugal food pulverizing and juice extractor constructed in accordance with this invention, the motor being shown in elevation.

Referring to the drawings, 7 designates an electric motor mounted on a base 7' and having a substantially vertical driven shaft 8 which extends upwardly therefrom. A cylindrical receptacle 9 is supported on the upper end portion of the motor 6 and the shaft 8 extends upwardly into the receptacle 9. A drain spout 10 is provided in the bottom portion of the receptacle 9 to permit the discharge of extracted juices or liquid. The upper end portion of the receptacle 9 preferably is closed by a removable cover member 11 which is secured to the receptacle 9 by bolt and wing nut means 12. Only one bolt and wing nut means is shown but preferably three of these bolt and wing nut devices will be provided. Also the form of the receptacle may be altered as shown in Fig. 6, by making a cover portion 11' which is relatively deep and a base portion 9' relatively shallow.

A screen holding device is mounted on the motor shaft 8 within the receptacle 9. This screen holding device comprises a disc shaped bottom plate 13 having a plurality of upwardly extending supports 14 at the peripheral portion thereof, which supports 14 are connected within cylindrical top ring 15. The upright supports 14 are spaced from the walls of the receptacle 9 and are relatively narrow leaving relatively large open spaces between these supports. Preferably these upright supports are bent to provide upright grooves 16 for the reception of upright rib portions 17 of a substantially cylindrical screen 18, as hereinafter set forth. The disc shaped bottom plate 13 has a centrally positioned hub portion 19 which fits over the shaft 8. Preferably the shaft 8 is of square cross section and is of gradual taper, being larger at the bottom and smaller at the top. The hub portion 19 has a square hole 20 which is tapered and adapted to fit over the square shaft 8 as shown in Figs. 1 and 3. By this means the screen holding member is accurately centered on the shaft 8 and firmly secured to said shaft so that it will rotate therewith but is readily removable from said shaft. Obviously the cross sectional shape of the shaft may be varied as long as means are provided for securing the screen holding member to said shaft in such a manner that it will rotate with the shaft and is quickly and easily removable therefrom. For instance, this shaft may be circular, see shaft 21 in Fig. 6, and may have a spline 22 thereon to fit within a suitably shaped opening in the hub portion of a screen holder.

The removable screen 18 is of finely perforated construction. The size of the perforations or openings 23 of this screen and distance between adjacent perforations is greatly exaggerated in the drawings. These sizes will vary with different screens. Several of said screens of different mesh are preferably provided for use with each machine. The character of the material being processed will determine the size of mesh of the screen to be used. I find that a screen having sixty perforations per inch gives satisfactory results in the extraction of juices from vegetables, such as carrots, spinach, parsley, cabbage, celery and the like.

Secured to the upper end portion of the shaft 8 and rotatable with said shaft 8 and with the screen holder and screen is a blade type rotor which functions both as a food pulverizing device and as a fan or blower. This rotor comprises a hub 24 having a plurality of outwardly extending blades 25 secured thereto. A ring 26 is welded or otherwise secured to the outer end portion of all of the blades 25 to strengthen and stabilize the rotor. The blades 25 are made of flat metal and have straight squared upper edge portions 27 which, when the rotor is rotated, move in a common path at substantially right angles to the axis of the shaft 8. The outer end portions of said blades are wide enough, in vertical directions, to provide a fan or blower action and to serve as beaters for the food and said outer end portions are curved or inclined rearward relative to the direction of rotation of the rotor member, see Fig. 5, so that said blades will draw air from above the rotor and drive said air downwardly when the rotor is rotated in the direction indicated by the arrows in Figs. 2 and 5. The rotor hub 24, shown in Fig. 1, has a square hole 31 therein which fits over the square upper end portion of the motor shaft 8. The bottom portion of this hub 24 rests on fixed stud means 32 on the shaft 8 and a readily removable wing nut 33 is provided for securing the rotor hub 24 on the shaft 8. Clearance grooves 34 are provided in the walls of the square hole 20 in the hub portion 19 of the screen holder, Figs. 1 and 3, so that the screen holder hub 19 may be slipped over the studs 32 in placing said screen holder on, or taking it off of the shaft 8. The taper of the shaft 8 insures a tight fit of both hubs 19 and 24 on said shaft.

A relatively fixed food chute 28 is secured to the cover member 11 and extends downwardly toward the rotor blades to a point just clear of the path of the top edges of said blades. The upper end portion of this chute is preferably outwardly flared to better receive material to be introduced therethrough. The lower end of the chute 28 is provided with narrow internal shoulders 29 to form stops for a feeding block or tool 30, a fragment of which is shown in Fig. 1. This feeding tool 30 is too large to pass the shoulders 29 and said shoulders 29 make it impossible for the feeding tool 30 to be thrust downwardly into the rotor.

The bottom end of the feed chute 28 is positioned in close proximity to the top edges of the blades 25 so that the rapidly rotating blades have both a shearing and a beating action on the material which is being introduced through the chute. As these blades travel at a very high velocity they reduce the material to a very finely divided pulp and thoroughly break up the cell structure of the material thus releasing substantially all of the juices. At the same time the blades 25 draw air downwardly through the chute 28 and bring this air into intimate contact with the finely pulverized food and the juices from said food thus aerating the food and the juices in a manner which is beneficial to some foods in improving flavor and retarding deterioration.

The blades 25 travel at a high speed and the feed chute 28 is positioned at a substantial distance from the center of the machine so that the blades strike the food at a very high velocity and, by a beating and grinding and shearing action, these blades reduce the food to an extremely finely divided or pulverized state thus breaking down the cell structure of the food very thoroughly and reducing food to a condition in which it is very quickly and very efficiently assimilated by the digestive organs of the human body. I have obtained satisfactory results by the use of a motor rotating at a speed of three thousand revolutions per minute and driving a blade type rotor about twelve inches in diameter.

The cover member of the machine is provided with a suitable handle as shown in Fig. 1. This cover member may be applied in different positions to the receptacle 9 thus making it possible to vary the position of the feed chute 28 relative to the spout 10 for the convenience of right or left hand operators.

Suitable control switches 35 and plug in means 36 are provided in connection with the motor 7 as shown in Fig. 1. Preferably the motor of the machine built for domestic use is of a type which may be used in connection with the usual home lighting circuit.

The screen 18 is readily removable and the machine is operable without this screen. If the machine is to be used as a juice extractor for pulping the foods and separating the juice therefrom, then the screen 18 is placed in the machine, as shown in Figs. 1 and 2, and the machine is operated by rotating the parts connected with the shaft 8 at high speed and feeding into the machine the foods from which the juice is to be extracted. The major portion of the pulp will be caught by the screen 18 to be later removed when the machine is opened, and the liquid content or juice will be forced outwardly through the screen 18 by centrifugal force and will discharge through the spout 10. If the machine is to be used for pulping the foods but not for extracting the juice the screen 18 is removed and the pulped foods together with the juice are allowed to be discharged from the spout 10, in instances where they will so discharge, or are removed from the receptacle 9 by taking off the cover 11, in case the pulped foods are too thick to flow from the spout 10.

When the machine is used for pulping the foods, with the screen 18 removed, the screen holder is preferably left in the machine as the upright supports 14 of said screen holder have a further beating effect on the foods and help in the aeration of the same.

When a receptacle of the form shown in Fig. 6, is used the removal of the upper portion 11 leaves all of the internal mechanism of the machine exposed for the purpose of inspection or cleaning or assembly or dis-assembly of the parts.

This machine is adapted for use in reducing to a pulp substantially any vegetable fruit or animal food product and for extracting from such pulp a very large percentage of the liquid content, as the juice or oil. In case of fruits having stones as peaches, plums and the like, the stones are removed before processing.

Figure 7:
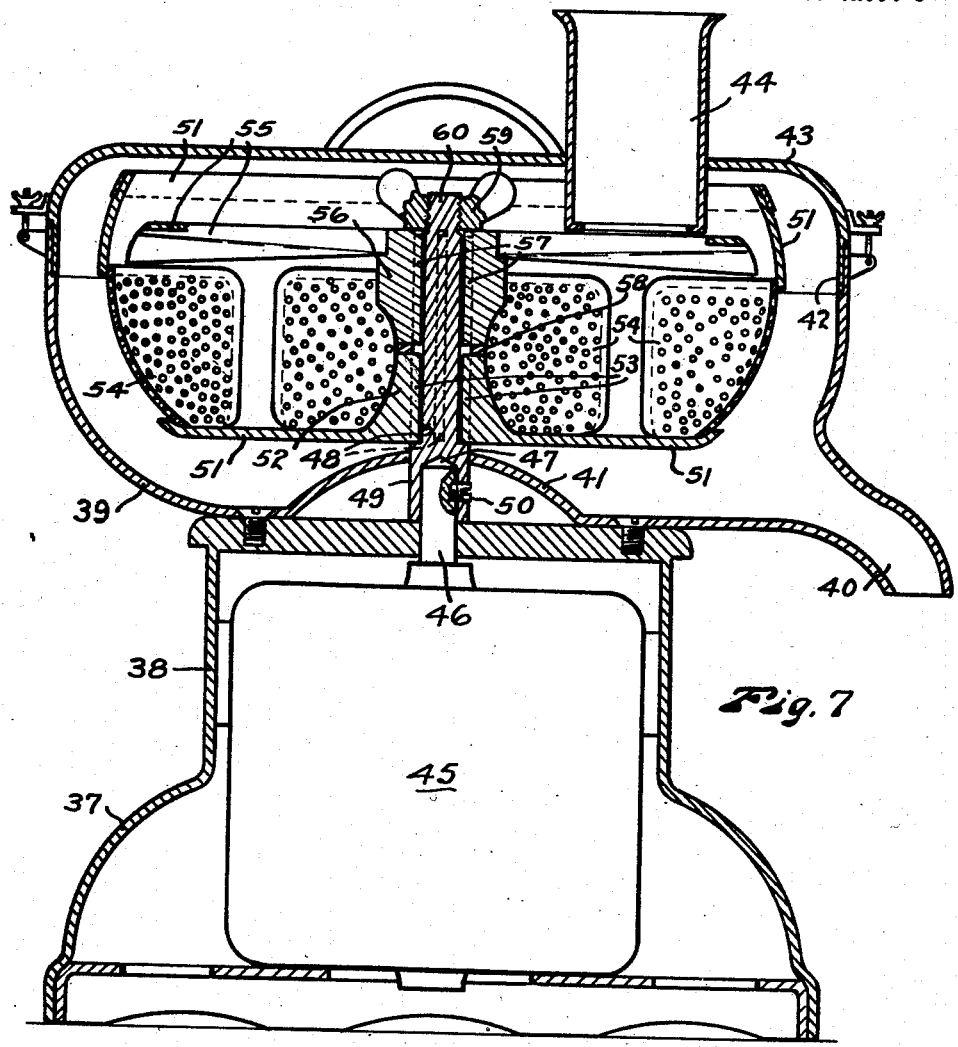
Fig. 7 is a vertical sectional view of a modified form of centrifugal food pulverizer and juice extractor constructed in accordance with my invention.
Figure 8:
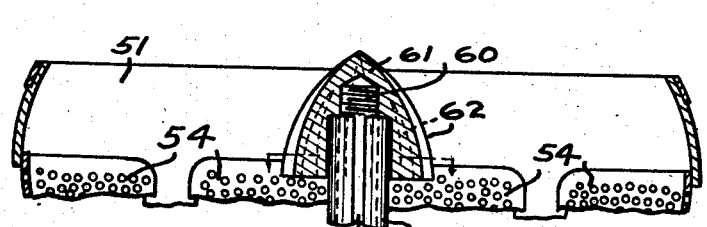
Fig. 8 is a fragmentary sectional view showing the cover portion of the machine removed and a citrus fruit reamer applied to the main shaft of the machine.
Figure 9:
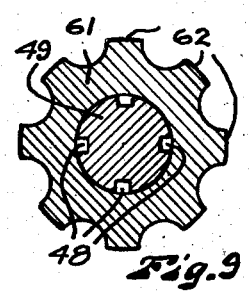
Fig. 9 is a sectional view through the citrus fruit reamer and main shaft taken substantially on broken line 9—9 of Fig. 8 and on a larger scale than Fig. 8.

Figs. 7, 8 and 9 show a modified form of this invention comprising a motor housing and support formed of a lower bell shaped section 37 and an upper cylindrical section 38. A bowl 39 is supported on the upper end portion of the housing section 38. The bowl 39 is provided with a discharge spout 40 and the bottom of said bowl is centrally provided with an upwardly bulging portion 41 which helps to prevent leakage of juice around the central shaft means. The bowl 39 is open at the top and is suitably shaped for the reception therein of a flange 42 on a cover 43. The cover 43 has a feed chute 44. The parts 39 to 40, 41, 43 and 44 are similar in purpose and function to the corresponding parts shown in Figs. 1 and 2 but are shaped somewhat differently and the cover 43 has the flange 42 which fits inside of the upper portion of the bowl.

A motor 45 is supported within the housing 37—38. The shaft 46 of motor 45 extends upwardly into a suitable socket 47 in the lower end portion of an extension shaft 49 and is fixedly secured to said extension shaft 49 by a set screw 50. Extension shaft 49 is preferably a shaft of circular cross section with longitudinal keyways 48 provided therein, see Fig. 9.

A bowl shaped centrifugal screen support 51 is provided with a hub 52 adapted to fit over the extension shaft 49, said hub 52 having integral key members 53 adapted to fit within the keyways 48 in extension shaft 49. The keyways 48 terminate short of the bottom end of the extension shaft 49 and the key members 43 rest against the shoulders formed by the ends of the keyways and support the member 51 clear of the member 41. Screen sections 54 of any desired mesh are provided in the sides of the centrifugal screen support 51.

A blade type rotor designated generally by numeral 55, and which is similar to the blade type rotor of Figs. 1 and 2, is provided in the machine shown in Fig. 7, this rotor 55 has a hub portion 56 adapted to fit over extension shaft 49 and provided with keys 57 adapted to fit within the keyways 48. It will be noted that the hub portion 56 is of substantial length to preclude danger of play. Preferably a sealing washer 58 is provided between adjacent ends of hub portions 52 and 56 to preclude the entrance of liquid therebetween. A nut 59 threads onto the upper end portion 60 of extension shaft 49 and secures the blade type rotor and the screen support 51 firmly in place on said shaft.

The operation of the device shown in Fig. 7, is substantially identical with the operation of the device shown in Figs. 1 and 2 and hereinbefore described, the blade members serving as combined blades and beaters and air circulating vanes to pulp and aerate the food and the rapidly rotating centrifugal screen extracting the liquid from the solids.

In extracting the juice from citrus fruit it is usually desirable to avoid extracting the oils and juices from the peeling. The easiest and quickest way to accomplish this is by cutting the citrus fruit in half and grinding or reaming the pulp out of the peeling of the citrus fruit. When the machine shown in Fig. 7, is to be used for this purpose I remove the cover 43 and remove the nut 59 and blade carrying rotor 55 and screw a fruit reamer 61 on the threaded upper end portion 60 of the extension shaft 49 as shown in Figs. 8 and 9. This reamer is of somewhat conical external shape except that the exterior thereof is curved and is externally provided with ribs 62 of the usual form. When this reamer is applied and the machine operated the reamer will be rotated rapidly and halves of citrus fruit applied to the reamer in the usual way will have the pulp and juice removed from the peeling. This pulp and juice will drop into the rapidly rotating centrifugal screen and the juice will be separated from the pulp thus providing a fruit juice which is substantially free from pulp.

All parts of the machines herein disclosed are preferably made of noncorrosive materials such as stainless steel, aluminum alloys or the like.

The foregoing description and accompanying drawings clearly disclose a preferred embodiment of my invention but it will be understood that this disclosure is merely illustrative and that such changes in the invention may be made as are fairly within the scope and spirit of the following claims.

I claim:

1. In a centrifugal juice extractor of the class described, a receptacle; a motor positioned below said receptacle and having a shaft extending upwardly into the receptacle; a screen holder within said receptacle mounted on said motor shaft and rotatable therewith; a bowl shaped screen member supported in said screen holder; a rotary cutter and blower member secured to the upper end portion of said shaft and positioned within the upper portion of said screen member, said cutter and blower member having a plurality of substantially radial blades having upper cutting edges movable in a plane at right angles to said motor shaft, said blades being pitched to impart a downward movement to the air when the device is in operation; a removable cover member on said receptacle; and a feed chute extending downwardly through said cover member and terminating in close proximity to the path of movement of the cutting edges of said blades, whereby material entering through said feed chute will be reduced to a finely divided state by said blades and whereby a high rotary velocity will be imparted to said material to expel liquids from said material outwardly through said screen member.

2. In a centrifugal juice extractor of the class described, a receptacle, a motor positioned below said receptacle and having a shaft extending upwardly into the receptacle; a screen holder mounted on said shaft and rotatable therewith and positioned within said receptacle, said screen holder comprising a disc shaped bottom portion connected by upright supports with a top ring, said upright supports being relatively narrow and being spaced apart; a removable cylindrical screen member supported within said screen holder; a rotary cutter and blower member secured to the upper end portion of said shaft and positioned within the upper portion of said screen member, said cutter and blower member having a plurality of substantially radial blades provided with cutting edges at their upper portions and pitched to direct air downwardly when the cutter and blower member is rotated in a predetermined direction; a reinforcing ring member connecting the cutter end portions of all of said blades; a removable cover member on said receptacle; and a feed chute extending downwardly through said cover member and terminating in close proximity to the path of movement of the upper cutting edges of said blades, whereby said blades will shear the material passing out of said feed chute and will impart a rapid rotary movement and a downward movement to said material.

3. A centrifugal juice extractor comprising a housing; a bowl supported on the upper portion of said housing; a motor disposed within said housing and having an upright shaft which extends upwardly through the top of said housing; an extension shaft positioned within said bowl and detachably secured to the upper end portion of said motor shaft; longitudinal keyways in said extension shaft; bowl shaped centrifugal screen having perforated peripheral sections and having a hub portion adapted to fit over said extension shaft and provided with key members adapted to fit within said keyways; a rotor having a hub portion adapted to fit over said extension shaft and provided with key members adapted to fit within said keyways, said rotor having blades; a cover for said bowl member; and a feed chute providing an opening through said cover and terminating in shearing relation to said blades.

4. In a centrifugal juice extractor of the class described, a receptacle; a motor positioned below said receptacle and having a motor shaft extending upwardly into the receptacle; a bowl shaped screen member of substantially smaller diameter than said receptacle positioned within said receptacle directly and connected with said motor shaft for high speed rotation therewith; a rotary cutter and blower member positioned within the upper portion of said receptacle and directly connected with said motor shaft for high speed rotation therewith, said cutter and blower member having a plurality of substantially radial blades having upper food comminuting edges movable in a plane perpendicular to said motor shaft, said blades being pitched to provide a downward blast of air when the device is in operation; a cover member on said receptacle; and a feed chute positioned to one side of the center of said cover member and extending downwardly through said cover member and terminating in close proximity to the path of movement of the upper edges of said blades, whereby material entering through said feed chute will be reduced to a finely divided state by the shearing and beating action of said blades and subjected to centrifugal force and to the downward and outward blast of air produced by said blades to expel liquid therefrom out through said screen.

ERNEST C. MacLEAN.